United States Patent
Kasravi et al.

(10) Patent No.: US 7,085,750 B2
(45) Date of Patent: Aug. 1, 2006

(54) METHOD AND SYSTEM FOR MAPPING A HYPOTHESIS TO AN ANALYTICAL STRUCTURE

(75) Inventors: Kasra Kasravi, West Bloomfield, MI (US); Sundararajan Varadarajan, Troy, MI (US)

(73) Assignee: Electronic Data Systems Corporation, Plano, TX (US)

( * ) Notice: Subject to any disclaimer, the term of this patent is extended or adjusted under 35 U.S.C. 154(b) by 720 days.

(21) Appl. No.: 10/185,998

(22) Filed: Jun. 28, 2002

(65) Prior Publication Data

US 2004/0002933 A1    Jan. 1, 2004

(51) Int. Cl.
G06F 15/18 (2006.01)
(52) U.S. Cl. ...................................................... 706/45
(58) Field of Classification Search ................... 706/45
See application file for complete search history.

(56) References Cited

U.S. PATENT DOCUMENTS

| | | | | |
|---|---|---|---|---|
| 5,220,622 A | * | 6/1993 | Scarr ............................ | 382/210 |
| 5,692,107 A | | 11/1997 | Simoudis et al. .............. | 395/50 |
| 5,933,818 A | | 8/1999 | Kasravi et al. ................ | 706/12 |
| 2003/0236795 A1 | * | 12/2003 | Kemp et al. .............. | 707/104.1 |

OTHER PUBLICATIONS

Integration of utterance verification with statistical language modeling and spoken language understanding, Rose, R.C.; Yao, H.; Riccardi, G.; Wright, J.; Acoustics, Speech, and Signal Processing, 1998, pp.:237-240.*
Shi, Hongchi et al., "*Using Natural Language to Access Databases on the Web*", 2001 IEEE International Conference on Systems Man and Cybernetics, SMC 2001, vol. 1 of 5, XP010567607, pp. 429-434, Oct. 7, 2001.
Chaudhuri, Surajit et al, "*An Overview of Data Warehousing and OLAP Technology*", Sigmod Record, Sigmod, New York, vol. 26, No. 1, XP002193792, pp. 65-74, Mar. 1997.
International Search Report for PCT/US 03/20951, 7 pages, Feb. 26, 2004.

* cited by examiner

*Primary Examiner*—Anthony Knight
*Assistant Examiner*—Michael B. Holmes
(74) *Attorney, Agent, or Firm*—Baker Botts L.L.P.

(57) ABSTRACT

A method for mapping a hypothesis to an analytical structure includes receiving the hypothesis from an interface and generating a representation of the hypothesis. The method includes generating a script of the representation by mapping the representation into a neutral grammar and transmitting the script to an analytical tool. The method may also include analyzing the script to form an analytical structure. The interface may comprise a human interface or a machine interface. The method may also include generating a linguistic expression of the hypothesis.

18 Claims, 2 Drawing Sheets

METHOD AND SYSTEM FOR MAPPING A HYPOTHESIS TO AN ANALYTICAL STRUCTURE

TECHNICAL FIELD OF THE INVENTION

This invention generally relates to the field of data analysis and, more particularly, to a method and system for mapping a hypothesis to an analytical structure.

BACKGROUND OF THE INVENTION

Advancements in technology have reduced the cost of computers to the point where many events in one's day are recorded by a computer. Events recorded by computer are numerous and include, for example, transactions made by an individual. Computers store the data associated with the transactions they process resulting in very large databases of information. Also, companies and individuals frequently use computers to record events related to a specific domain. For example, a meteorologist may enter into a computer database many records of data relating to weather occurrences.

One problem arises of how to make efficient use of the tremendous amount of information in these databases. When the number of records in a database rises to a certain level, simply sorting the information in the database provides no meaningful results. While statistical analysis of the records in a database may yield useful information, such analysis must generally be performed by persons with advanced training in math or computer science. Typically, these people are also needed to understand the results of the analyses. Additionally, translation of the statistical analysis of the information in a large database into a useful form is also difficult. For example, a strategic business activity such as marketing may require analytical information to be converted into a form specifically suited to the activity of marketing. Difficulties in providing or obtaining information in a useful form may prevent the effective use of the information in a database and preclude the use of a possibly valuable data resource.

Organizations of all types commonly collect and store business and technical data in various types of databases. Strategic and/or technical knowledge may be contained in the databases. In some instances, based on many years of experience, experts are able to glean knowledge from databases existing in their particular domain of expertise. In the absence of such experts, however, strategically useful information may not be available to the organization controlling or accessing a given database. The inability to obtain this knowledge may be detrimental to the business objectives of the organization. For example, if a business cannot extract useful knowledge from the data it possesses, it will likely be at a competitive disadvantage compared to a business that can discover such knowledge. Thus, the ability to discover knowledge from data contained in databases would be a valuable asset to any organization.

Certain tools are available which assist a non-expert to gain some knowledge from a database, such as data mining tools. Certain tools are also available to assist analysts to validate hypotheses through interactive exploration, such as OLAP and multidimensional database analysis tools. For example, some data analysis tools respond to queries input by the user. A query might be: "How many people within the database are between the ages 30 and 35?" The data analysis tool looks to all the records in which an age field meets the age range requirement of the query. Then, the tool simply counts the number of records. Query tools require the user to have an extensive knowledge of the database domain and the queries generally are very rigid in their structure. One example of a data mining tool is described in U.S. Pat. No. 5,933,818, entitled "Autonomous Knowledge Discovery System and Method."

Data analysis tasks typically require skilled analysts and significant time and also may introduce opportunities for errors due to steps that require manual intervention.

SUMMARY OF THE INVENTION

The present invention provides a method and system for mapping a hypothesis to an analytical structure that substantially eliminates or reduces at least some of the disadvantages and problems associated with previous methods and systems.

In accordance with a particular embodiment of the present invention, a method for mapping a hypothesis to an analytical structure includes receiving the hypothesis from an interface and generating a representation of the hypothesis. The method includes generating a script of the representation by mapping the representation into a neutral grammar and transmitting the script to an analytical tool. The method may also include analyzing the script to form an analytical structure. The interface may comprise a human interface or a machine interface. The method may also include generating a linguistic expression of the hypothesis.

In accordance with another embodiment, a system for mapping a hypothesis to an analytical structure includes a memory comprising a hypothesis representation module operable to receive the hypothesis from an interface. The hypothesis representation module is further operable to generate a representation of the hypothesis. The memory also includes a hypothesis mapping module operable to generating a script of the representation by mapping the representation into a neutral grammar. The system also includes a processor coupled to the memory. The processor is operable to transmit the script to an analytical tool. The memory may also include analytical tool. The analytical tool may be operable to analyze the script to form an analytical structure. The interface may comprise a human interface or a machine interface. The hypothesis representation module may be further operable to generate a linguistic expression of the hypothesis.

Technical advantages of particular embodiments of the present invention include the automatic mapping of a hypothesis into a script. The script comprises a neutral grammar that any of a number of analytical tools may understand. Thus, substantial time and resources may be saved because additional or substantial customization is not needed to enable the analytical tool to read and parse the script. Moreover, the hypothesis may be entered by a machine interface or a human interface in any number of ways or formats. This saves additional time and resources since extensive training of users relating to how hypotheses should be entered may be reduced.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
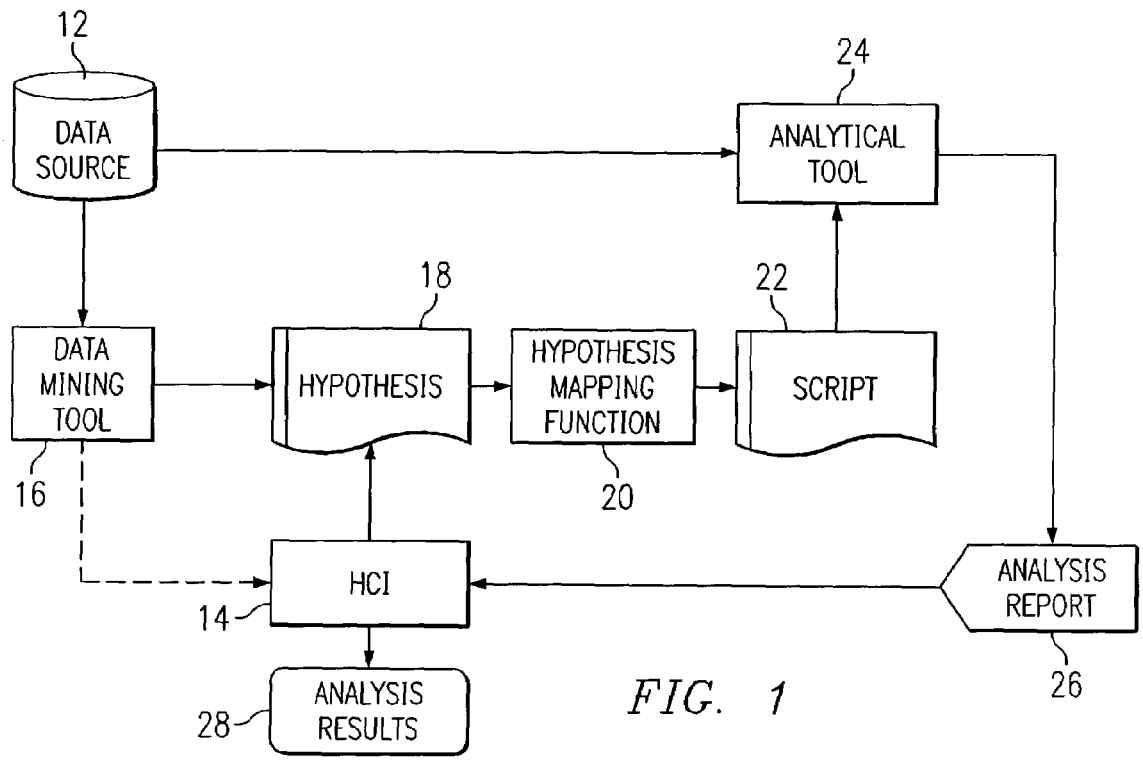
FIG. 1 is a schematic diagram illustrating a process for mapping a hypothesis to an analytical structure, in accordance with an embodiment of the present invention.

FIG. 1 is a schematic diagram illustrating a process for mapping a hypothesis to an analytical structure. A hypothesis 18 is formulated by a human computer interface 14 or by a machine, such as a data mining tool 16. When formulating hypothesis 18, a data source 12 is selected for use in testing hypothesis 18. A hypothesis mapping function 20 generates a representation of hypothesis 18 and maps the hypothesis representation into a script 22. Script 22 is an expression of the hypothesis representation that an analytical tool 24 can understand. Analytical tool 24 reads and parses script 22 and uses data source 12 to test the hypothesis. Analytical tool 24 generates an analysis report 26 of the results. A user may evaluate analysis report 26 and refine the process or release analysis results 28. The illustrated process provides a manner whereby a user may enter a hypothesis which is automatically mapped into a script of a neutral grammar that any of a number of analytical tools may understand and analyze without additional or substantial customization.

Data source 12 may be a database that includes information of various domains and formats. The data formats of data source 12 may include for example text, numeric, date/time, boolean and other data formats. Data source 12 may include only the data selected to be used in testing hypothesis 18, or it may include a larger set of data from which the data to be used for hypothesis testing is selected.

As stated above, the formulation of hypothesis 18 may be undertaken by human computer interface 14 or by a machine such as data mining tool 16. Data mining tool 16 is an automated hypothesis generation tool.

In particular embodiments hypothesis mapping function 20 also formulates a linguistic expression of the hypothesis. The linguistic expression is a formulation of the hypothesis that a user can understand, for example, in plain or natural language. In particular embodiments the linguistic expression of the hypothesis may be similar to the original hypothesis formulated by human computer interface 14. However, in some situations when multiple human computer interfaces formulate hypotheses, such hypotheses may not be formulated in the same format. Thus, the linguistic expression generated by hypothesis mapping function 20 provides a consistent format for different hypotheses to be expressed in a way that users may understand.

As stated above, script 22 is an expression of the hypothesis representation in a language that an analytical tool may understand. Examples of such analytical tools are discussed below. The language used for script 22 may be a neutral format such that analytical tools of various types may be able to read and parse script 22. Script 22 may include a tag-based language, such as eXtensible Markup Language (XML). In such cases, each hypothesis, data source and other parameters will be mapped into a tag. Default values may be used for unspecified parameters of the script.

As stated above, analytical tool 24 reads and parses script 22 and uses data source 12 to test the hypothesis and generate an analysis report 26 of the results. Analytical tool 24 tests hypothesis 18 by analyzing data source 12 and creating value by drawing appropriate conclusions that either support or negate hypothesis 18. Analytical tool 24 may be of a type that is commercially available such as Cognos Powerplay™, MicroStrategy™, SAS EnterpriseMiner™, Hyperion Essbase™ or Databeacon™. Other analytical tools may also be used, such as custom applications.

Figure 2:
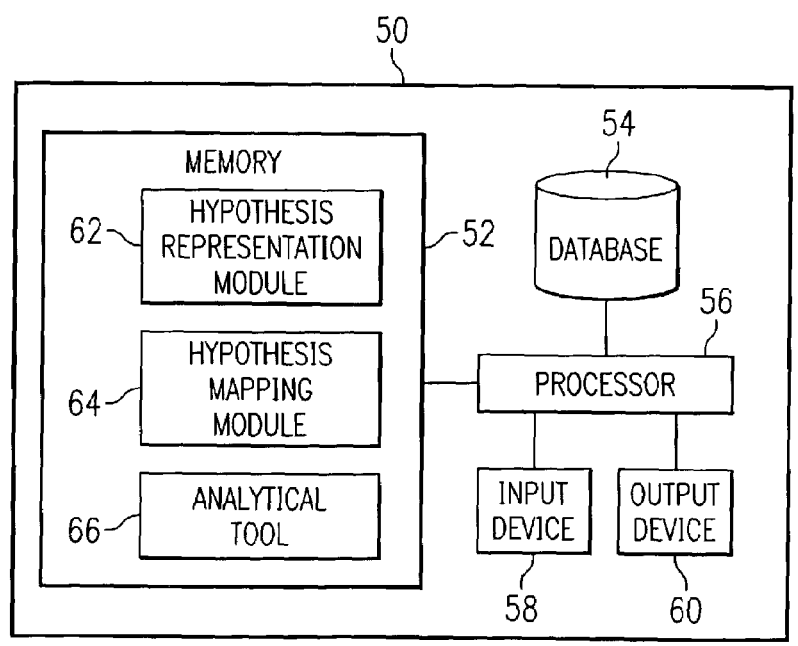
FIG. 2 illustrates a system for mapping a hypothesis to an analytical structure, in accordance with an embodiment of the present invention.

FIG. 2 illustrates a system 50 for mapping a hypothesis to an analytical structure in accordance with an embodiment of the present invention. System 50 includes a memory 52, a database 54, a processor 56, an input device 58, and an output device 60. Processor 56 is typically a microprocessor, controller or any other suitable computing device or resource. Processor 56 is adapted to execute various types of computer instructions in various computer languages for implementing functions available within system 50. Memory 52 will usually be any form of volatile or non-volatile memory including, without limitation, magnetic media, optical media, random access memory (RAM), read-only (ROM), removable media or any other suitable memory component. Memory 52 includes components or software executable by processor 56. Components of memory 52 may be otherwise combined and/or divided for processing within the scope of the present invention. Memory 52 includes a hypothesis representation module 62, a hypothesis mapping module 64 and an analytical tool 66. In particular embodiments hypothesis representation module 62, hypothesis mapping module 64 and analytical tool 66 may be combined into or encompassed in any number of components.

Database 54 acts as a storage vehicle for system 50. Database 54 may include various types of data and information used in the testing and analysis of a hypothesis. For example, database 54 may be a customer database of a business that includes information on the types of products purchased, frequency of purchase, quantity of purchase, and other general information on customers, e.g., age, gender, marital status, etc. As another example, database 54 may include accident records for an automobile maker, such as dates of accidents, automobile types involved in the accidents, ages of drivers involved in the accidents, weather at the times of the accidents, etc.

The information included in database 54 may be compiled using records and dimensions. Records are domains of information. Dimensions are fields or attributes. The dimensions may be discrete, continuous or another type. For example, a discrete dimension may be a color like red, blue or green. A continuous dimension may be, for example, age.

Hypothesis representation module 62 is adapted to generate a representation of a hypothesis received through a human computer interface or a machine. An example form of such hypothesis representation is further discussed below.

Hypothesis mapping module 64 is adapted to generate a script by mapping the hypothesis representation generated by hypothesis representation module 62 into grammar of a neutral format to be read and understood by analytical tool 66. The neutral format of the grammar enables analytical tools of various types to understand the script without additional or substantial customization. The script may include the hypothesis to be tested, the data associated with such hypothesis and any relevant conditions. The mapping of the hypothesis representation into grammar for the script may be a one-to-one mapping (i.e., data source to data source, record to record, dimension to dimension, range within a dimension to range within a dimension).

Analytical tool 66 is able to analyze the script generated by hypothesis mapping module 64 and test the hypothesis represented by the script using data from database 54 to create an analytical structure. Analytical tool 66 may be a type that is commercially available, such as Cognos Powerplay™, MicroStrategy™, SAS EnterpriseMiner™, Hyperion Essbase™ or Databeacon™, or a customized type.

System 50 also includes an input device 58 and an output device 60. Input device 58 may be a keyboard, mouse, touch pad or any other suitable component for inputting information into the system. Output device 60 may be a disk drive, printer, display or any other component for outputting information such as an analysis report of the results of hypothesis testing. System 50 may include other components, such as a modem for making connections to external communication media.

Figure 3:
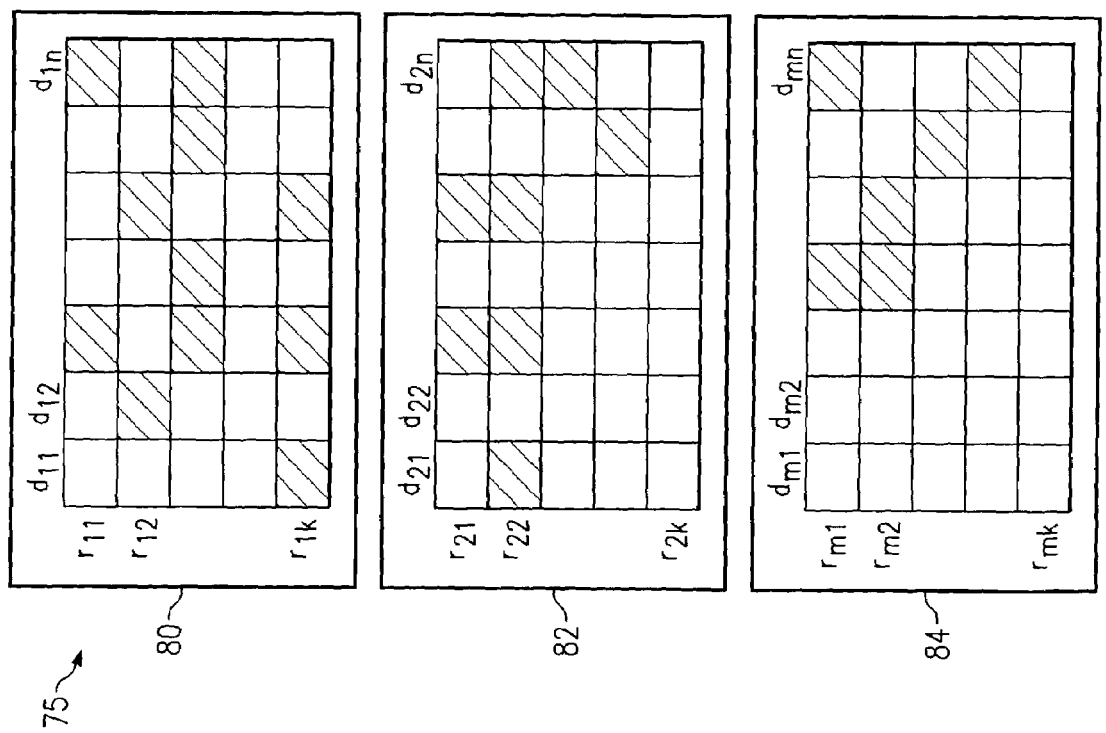
FIG. 3 illustrates a data representation, in accordance with an embodiment of the present invention.

FIG. 3 illustrates a data representation, in accordance with an embodiment of the present invention. Data may be represented in the illustrated manner in a data source or a database. Data representation 75 includes tables 80, 82 and 84. Each table includes rows (r) of records and columns (d) of dimensions. As stated above, records are domains of information. Dimensions are fields or attributes. The dimensions may be discrete, continuous or another type. For example, a discrete dimension may be a color like red, blue or green. A continuous dimension may be, for example, age.

In a particular embodiment, R denotes the set of data records in all tables ($R=\{R_1 \cup R_2 \cup \ldots R_m\}$). $R_i$ denotes the set of records in table i ($R_i=\{r_{i1}, r_{i2}, \ldots r_{ik}\}$). D denotes the set of dimensions in all tables ($D=\{D_1, D_2, \ldots D_g\}$). $D_i$ denotes the set of dimensions in table i with m dimensions $D_i=\{d_{i1}, d_{i2}, \ldots d_{in}|d_{ij}$ is of discrete, continuous or other type$\}$). $\lambda d$ is a subset of values of dimension d as a function of d's type, for example, discrete, continuous, etc. such that $D'_i=\{\lambda d_{ij}|d_{ij} \epsilon D_i$ where $j=1 \ldots n\}$. For example, if a dimension type is discrete and the dimensions are people's first names such as John, Joe, Beth and Jane, then a $\lambda d$ may represent, for example, the male names (John, Joe) and not the female names. As another example, if a hypothesis is analyzing car accidents involving people of a particular age group, or example ages 18–20, then the appropriate $\lambda d$ for the hypothesis would be the subset of people who are 18 to 20 years old out of a set of people of all ages. As another example a hypothesis that involved particular dates might be limited to dates in the months of December and January only. Thus, $\lambda d$ is a subset of the data in any of the dimensions, and $\lambda d$ depends on the type of such data, whether discrete, continuous or otherwise.

Figure 4:
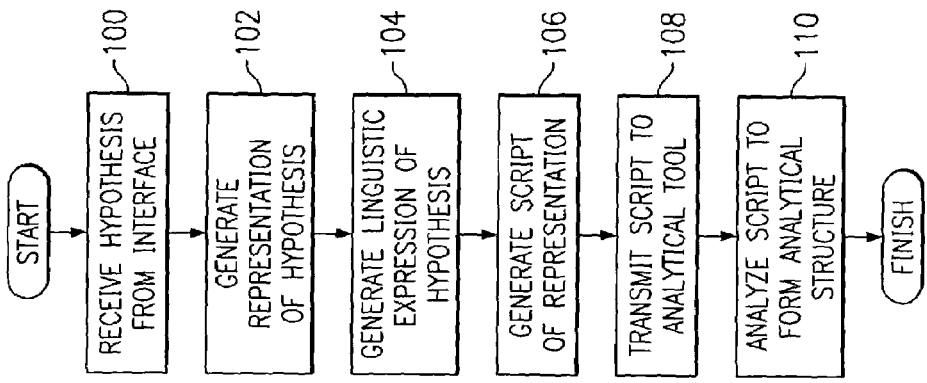
FIG. 4 is a flowchart illustrating a method for mapping a hypothesis to an analytical structure, in accordance with an embodiment of the present invention.

FIG. 4 is a flowchart illustrating a method for mapping a hypothesis to an analytical structure in accordance with an embodiment of the present invention. The method begins at step 100 where a hypothesis is received from an interface. The interface may be a human interface or a machine interface. The hypothesis may be received in any number of formats. For example, a hypothesis received from a human interface may be in a different format than a hypothesis received from another human interface or a machine interface. Likewise, a hypothesis received from a machine interface may be in a different format than a hypothesis received from another machine interface or a human interface. The ability to receive hypothesis in different formats saves time and resources since the amount of training relating to how hypotheses should be entered is reduced. The source of data against which the hypothesis may be tested may also be received or indicated.

At step 102, a representation of the hypothesis is generated which is internal (as opposed to a linguistic expression of the hypothesis which is external). The representation of the hypothesis comprises a format from which a script for an analytical tool can be subsequently generated. In particular embodiments, the representation indicates data against which the hypothesis may be tested. An example of the form of a hypothesis representation, such as a hypothesis representation generated by hypothesis representation module 62 of FIG. 2 is as follows:

$$H_i = \{\{r|r \epsilon R_k, R_k \subseteq R\} \cap \{\lambda d|\lambda d \epsilon D'_j \subseteq D\}\}$$

where r defines the domain, records or prior observations used to test the hypothesis and where $\lambda d$ defines the relevant dimensions and value ranges. As an example, a hypothesis might include a statement such as "Drivers of ages 18–20 in midwestern states are more likely to kill themselves when driving SUVs." In this example, the domain (r) may include a set of all automobile accidents. The relevant dimensions or value ranges ($\lambda d$) may include fatal automobile accidents, automobile accidents in midwestern states, and automobile accidents involving drivers of ages 18–20.

At step 104, a linguistic expression of the hypothesis is generated. The linguistic expression is a formulation of the hypothesis that a user can understand. In particular embodiments, the linguistic expression of the hypothesis can be formulated by filling in blanks of a template with actual data. Many types of templates may be used for various hypotheses. Each template expresses a unique concept in natural language. For example, a sample linguistic template may be as follows:

When <field> is <operator> <value> and <field> is <value>, then <field> is likely to be <value> approximately <precision> of the time.

A sample linguistic expression of a hypothesis wherein the template includes actual data may be as follows:

When temperature is greater than 45 and humidity is high, then defect is likely to be run-in-paint approximately 60% of the time.

Particular embodiments may not include generating a linguistic expression of the hypothesis.

At step 106, a script of the hypothesis representation is generated by mapping the representation into a neutral grammar. The script is generated in a neutral grammar for automatic understanding by any of a number of analytical tools without additional or substantial customization. As stated above, the mapping of the hypothesis representation into grammar for the script may be a one-to-one mapping. The automatically generated script of a neutral grammar saves substantial time and resources because the hypothesis will not have to be entered in a format that is specific to a particular analytical tool.

In particular embodiments, the grammar used for the script may be tag-based. Table A below illustrates example script tags which may be used in particular embodiments.

TABLE A

| Feature | Tag | Notes |
| --- | --- | --- |
| Analysis | <analysis> | Parent class |
| Title | <title> | One per analysis |

TABLE A-continued

| Feature | Tag | Notes |
|---|---|---|
| Description | <description> | One per analysis |
| Data Source | <ds> | Many per analysis |
| Data Source Type | <dstype> | Test or Validation |
| Data Source Path | <dbpath> | Nests in <ds> |
| Database | <db> | Nests in <ds> |
| Table/Query | <table> | Nests in <db> |
| Database Field(s) | <dimension> | Nests in <table> |
| Database Record(s) | <instance> | Nests in <table> |
| Field Type | <fieldtype> | Nests in <table> |
| Hypothesis | <hypothesis> | Many per analysis |
| Hypothesis Dimension | <hdimension> | Many per hypothesis |
| Record Sample Rate | <samplerate> | Nests in <hypothesis> |
| Hypothesis Member(s) | <hmember> | Many in <hypothesis> |
| Hypothesis Description | <hdescription> | One per <hypothesis> |
| Dimension Subsheet | <hdsub> | One per <hdimension> |
| Function Library | <flibrary> | Many per analysis |
| If Condition | <if> | Many per analysis |
| Else Condition | <ifelse> | One per <if> |
| Then Condition | <ifthen> | One per <if> |
| Variable | <variable> | Untyped, Many per analysis |
| Expression | <expression> | Many per analysis |
| SQL Statement | <sql> | Many per <ds> |

In particular embodiments, the following features from Table A may be part of the r (records) portion of a hypothesis: data source, data source type, data source path, database, table/query, database field(s), database record(s), field type and SQL statement. It should be understood that in other embodiments, some of the features discussed above may be part of the d (dimensions) portion of a hypothesis. In particular embodiments, the following features from Table A may be part of the d (dimensions) portion of a hypothesis or part of another portion of a hypothesis: hypothesis, hypothesis dimension, record sample rate, hypothesis member(s), hypothesis description, dimension subset, function library, if condition, else condition, then condition, variable and expression. It should be understood that in other embodiments, some of the features discussed above may be part of the r (records) portion of a hypothesis or part of another portion of a hypothesis.

An example script generated by hypothesis mapping module 64 of FIG. 2 using some of the example script tags above from Table A is as follows:

```
<analysis>
<title> Root causes of vehicle paint defects </title>
<description> Using one months of data from the paint
shop at GM's Saturn plant in TN, a number of concepts
were developed to study the causes of defects in
paint </description>
<ds> Saturn data, 2/1997<dstype>Validation</dstype>
<dspath> \\server5\ <\dspath> <db>sat-pnt-0297.mdb
<table>week1</table><table>week2</table><table>week3
</table> <table>week4</table></db></ds>
<hypothesis><hdescription>When temperature is high
and humidity is low, there is a 50% chance for pop in
paint<samplerate>45</samplerate></hdescription><hdime
nsion>Temperature<hdsub>45–100></hdsub></hdimension>
<hdimension>Humidity<hdsub>15–25</hdsub></hdimension>
<hdimension>Defect<hmember>pop</hmember></hdimension>
<hdimension>Panel</hdimension></hypothesis>
</analysis>
```

In the example script above, the title is "Root causes of vehicle paint defects." The description is "Using one month of data from the paint shop at GM's Saturn™ plant in Tennessee, a number of concepts were developed to study the causes of defects in paint." The data source is "Saturn data" from February, 1997. The data source type is validation. The database is identified as "sat-pnt-0297. mdb," and four tables are selected ("week 1,""week 2," "week 3" and "week 4"). The hypothesis is then described as "When temperature is high and humidity is low, there is a 50% chance for pop in paint." The sample rate 45%. Dimensions (or fields) of "Temperature" within a range of 45–100 will be used, and dimensions of "Humidity" within a range of 15% to 25% will be used to test the hypothesis. The script also refers to dimensions "Defect" and "Panel;" however, nothing is pulled from them because the hypothesis is attempting to conclude what types of defects arise and the panels on which they arise. Thus, the example script above describes the hypothesis and the data against which the hypothesis will be tested.

At step 108, the script is transmitted to an analytical tool for analysis. The analytical tool to which the script is transmitted may be one that is commercially available or one of a customized type.

At step 110, an analytical tool analyzes the script to form an analytical structure. The analytical structure is a representation of the hypothesis that is suitable for analysis by the analytical tool.

An example of the form of an analytical structure, such as an analytical structure formulated by analytical tool 66 of FIG. 2 is as follows:

$$A_i = \{\{f(d) | d \in D_k, D_k \subseteq D\}, \{r' : r' \in R_j, R_j \subseteq R\}, C_i\}$$

where $f(d)$ is a function operating on d, r' is the test data records, and $C_i$ is the statistical confidence of $A_i$. Particular embodiments of the present invention may not include step 110.

Although the present invention has been described in detail, various changes and modifications may be suggested to one skilled in the art. It is intended that the present invention encompass such changes and modifications as falling within the scope of the appended claims.

What is claimed is:

1. A computer-implemented method for mapping a hypothesis to an analytical structure, comprising:
   receiving a hypothesis from an interface;
   generating a representation of the hypothesis, the representation comprising at least one data source, at least one record and at least one dimension associated with the at least one record;
   generating a script of the representation by mapping the representation into a neutral grammar;
   transmitting the script to an analytical tool; and
   analyzing the script to form an analytical structure, the analytical structure comprising a confidence factor.

2. The method of claim 1, wherein the interface comprises a human interface.

3. The method of claim 1, wherein the interface comprises a machine interface.

4. The method of claim 1, further comprising generating a linguistic expression of the hypothesis.

5. The method of claim 1, wherein the grammar comprises a tag-based grammar.

6. The method of claim 1, wherein the grammar comprises extensible Markup Language (XML).

7. A system for mapping a hypothesis to an analytical structure, comprising:
   a memory comprising:
      a hypothesis representation module operable to receive a hypothesis from an interface, wherein the hypothesis representation module is further operable to generate a representation of the hypothesis, wherein the representation comprises at least one data source, at least one record and at least one dimension associated with the at least one record; and a hypothesis mapping module operable to generating a script of the representation by mapping the representation into a neutral grammar;

a processor coupled to the memory, the processor operable to transmit the script to an analytical tool;

the memory comprising the analytical tool; and wherein the analytical tool is operable to analyze the script to form an analytical structure, the analytical structure comprising a confidence factor.

8. The system of claim 7, wherein the interface comprises a human interface.

9. The system of claim 7, wherein the interface comprises a machine interface.

10. The system of claim 7, wherein the hypothesis representation module is further operable to generate a linguistic expression of the hypothesis.

11. The system of claim 7, wherein the grammar comprises a tag-based grammar.

12. The system of claim 7, wherein the grammar comprises eXtensible Markup Language (XML).

13. The method of claim 1, wherein the at least one dimension comprises a discrete dimension.

14. The method of claim 1, wherein the at least one dimension comprises a continuous dimension.

15. The method of claim 1, wherein the representation of the hypothesis comprises the form $H_i=\{\{r|r\epsilon R_k, R_k \subseteq R\} \cap \{\lambda d|\lambda d \epsilon D'_j \subseteq\}\}$.

16. The system of claim 7, wherein the at least one dimension comprises a discrete dimension.

17. The system of claim 7, wherein the at least one dimension comprises a continuous dimension.

18. The system of claim 7, wherein the representation of the hypothesis comprises the form $H_i=\{\{r|r\epsilon R_k, R_k \subseteq R\} \cap \{\lambda d|\lambda d \epsilon D'_j \subseteq\}\}$.

* * * * *